United States Patent [19]

Akashi et al.

[11] Patent Number: 5,589,237
[45] Date of Patent: Dec. 31, 1996

[54] REVERSIBLE DISPLAY MEDIUM

[75] Inventors: Ryojiro Akashi; Takashi Morikawa; Masanobu Ninomiya; Takashi Uematsu, all of Minami Ashigara, Japan

[73] Assignee: Fuji Xerox Co., Ltd., Tokyo, Japan

[21] Appl. No.: 262,910

[22] Filed: Jun. 21, 1994

[30] Foreign Application Priority Data

| Jun. 25, 1993 | [JP] | Japan | ................................. 5-177628 |
| Sep. 7, 1993 | [JP] | Japan | ................................. 5-246147 |
| Oct. 6, 1993 | [JP] | Japan | ................................. 5-272969 |
| May 11, 1994 | [JP] | Japan | ................................. 6-120753 |

[51] Int. Cl.$^6$ ............................ C09K 19/52; G02F 1/137
[52] U.S. Cl. ................. 428/1; 252/299.01; 252/299.68; 359/43; 359/45; 359/63; 359/72; 428/480; 349/22; 349/96; 349/116
[58] Field of Search ....................... 428/1, 480; 359/43, 359/45, 63, 72, 84; 252/299.01, 299.68

[56] References Cited

U.S. PATENT DOCUMENTS

| 4,837,745 | 6/1989 | Eich | ............................. 365/108 |
| 4,965,591 | 10/1990 | Kurabayashi | ...................... 346/108 |
| 5,173,381 | 12/1992 | Natansohn | ............................ 430/19 |
| 5,354,498 | 10/1994 | Akashi | ........................... 252/299.01 |

FOREIGN PATENT DOCUMENTS

| 54-119377 | 9/1979 | Japan. |
| 55-154198 | 12/1980 | Japan. |
| 60-180887 | 9/1985 | Japan. |
| 62-116192 | 5/1987 | Japan. |
| 2-42415 | 2/1990 | Japan. |
| 2-117888 | 5/1990 | Japan. |
| 2175288 | 7/1990 | Japan. |
| 3-53285 | 3/1991 | Japan. |

OTHER PUBLICATIONS

"Thermotropic Liquid–Crystalline Polymers–VI", Valery P. Shibaev et al., *Eur. Polym. J.*, vol. 18, 1982, pp. 651 to 659.
"Application of Side Chain Type Liquid Crystal Polymer for Display and Recording Devices", T. Nakamura, et al., *Mol. Cryst. Liq. Cryst.*, vol. 169, pp. 167–192.

*Primary Examiner*—Nasser Ahmad
*Attorney, Agent, or Firm*—Oliff & Berridge

[57] ABSTRACT

A reversible display medium comprising substrate 1 having thereon recording layer 2 containing a side chain type high polymeric liquid crystal capable of repeatedly and reversibly switching between a transparent state and a light-scattered state by the action of heat, an electrical field or a magnetic field, wherein said side chain type high polymeric liquid crystal is a copolymer comprising at least one liquid crystal monomer unit and at least one non-liquid crystal monomer unit having a hydrogen bond-forming substituent, e.g., a hydroxyl group, a carboxyl group, a sulfonic group or a phosphoric group. The display medium is excellent in durability on repeated use, heat sensitivity, display contrast, and record preservability.

9 Claims, 1 Drawing Sheet

REVERSIBLE DISPLAY MEDIUM

FIELD OF THE INVENTION

This invention relates to a reversible display medium. More particular, it relates to a display medium which can be repeatedly used as heat-sensitive recording paper, a projection display medium (e.g., over-head projector (hereinafter abbreviated as OHP) sheet), or a white board-like wide display medium and is therefore advantageous for resources conservation.

BACKGROUND OF THE INVENTION

Paper has been used for a long time as a medium for display and storage of information. Notwithstanding the current trend of paperless information processing with the spread of flat panel displays, the use of paper is still increasing, far from decreasing. This seems to be because paper is a display medium of reflection type soft to the eye and is excellent in flexibility and handiness. Display media other than paper, for example, an OHP sheet comprising polyester, etc., on which a toner image can be formed, are also extending their use for obtaining a wide display.

However, to use large quantities of paper or plastics as a display medium has given a rise to an issue from the standpoint of resources saving or environmental conservation. Under such a situation, various display media which may substitute for paper have been developed. Examples of display media heretofore proposed include a reversible heat-sensitive display medium which comprises a high polymer matrix having dispersed therein an organic low-molecular weight compound and is capable of controlling light scattering and transmission through control of the heat applied as disclosed in JP-A-54-119377 and JP-A-55-154198 (the term "JP-A" as used herein means an "unexamined published Japanese patent application"); a reversible heat-sensitive display medium comprising a film of a polymer blend which makes a display through heat-controlled phase separation as disclosed in JP-A-60-180887 and JP-A-62-116192; and a reversible display medium using a high polymeric liquid crystal which makes a display through a similar mechanism as disclosed in JP-A-2-117888 and JP-A-3-53285.

Recording on these reversible display media is carried out by application of heat under control usually by means of a thermal head or a thermal roll.

The reversible heat-sensitive display medium comprising a high polymer matrix film containing an organic low-molecular weight compound or the reversible heat-sensitive display medium comprising a polymer blend film reversibly switches between a light-transmitted state (transparent state) and a light-scattered state (opaque state) by controlling the compatibility of the binary system by means of heat. However, on repetition of the switching between these two states, the two components of the binary dispersed or mixed system are deteriorated and the distinction between the two states becomes unclear. It follows that the contrast is reduced and the number of times of repetition is so limited.

The known reversible display media using high polymeric liquid crystals have a low display contrast, insufficient record preservability, and insufficient heat sensitivity.

In addition, a recording layer comprising high polymeric liquid crystals tends to undergo deterioration due to heat for recording or surface deformation due to pressure applied on recording with a thermal head, also limiting the number of times of repetition. If a heat-resistant protective layer is provided on the recording layer for prevention of the surface deterioration, the high polymeric liquid crystal layer will be orientated due to shrinkage of the protective layer and become transparent.

It has been proposed to crosslink a high polymeric liquid crystal to improve heat resistance and thereby to prevent surface deformation on recording as disclosed in JP-A-2-42415. However, it is likely that crosslinking of a high polymeric liquid crystal interferes with orientation of the liquid crystal molecules, resulting in reduction of their characteristics.

SUMMARY OF THE INVENTION

Accordingly, an object of the present invention is to provide a reversible display medium excellent in durability on repeated use, heat sensitivity, display contrast, and record preservability.

The present inventors have conducted extensive study on high polymeric liquid crystals as a material of a recording layer. It has now been found, as a result, that a side chain type high polymeric liquid crystal copolymer comprising at least a liquid crystal monomer and a non-liquid crystal monomer having a hydrogen bond-forming substituent accomplishes optimization of the multi-domain structure of the high polymeric liquid crystal, which is decisive of display characteristics, improvement in mechanical strength, and optimization of heat sensitivity, thereby to provide a reversible display medium with excellent characteristics, such as durability on repeated use, heat sensitivity, display contrast, and record preservability. The present invention has been completed based on this finding.

The present invention relates to a reversible display medium comprising a substrate having thereon a recording layer containing a side chain type high polymeric liquid crystal capable of repeatedly switching between a transparent state and a light-scattered state by the action of at least one of heat, an electrical field, and a magnetic field, said side chain type high polymeric liquid crystal being a copolymer comprising at least a repeating unit derived from a liquid crystal monomer and a repeating unit derived from a non-liquid crystal monomer having a hydrogen bond-forming substituent.

DETAILED DESCRIPTION OF THE INVENTION

Figure 1:
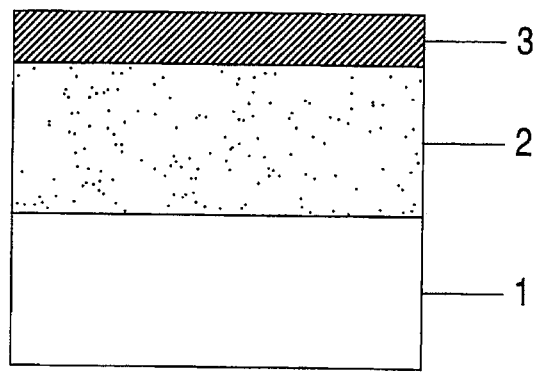
FIG. 1 shows a basic layer structure of the reversible display medium according to the present invention.
Figure 2:
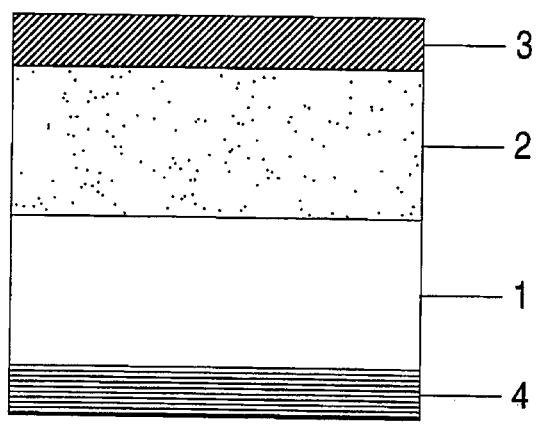
FIG. 2 shows another layer structure of the reversible display medium according to the present invention.
Figure 3:
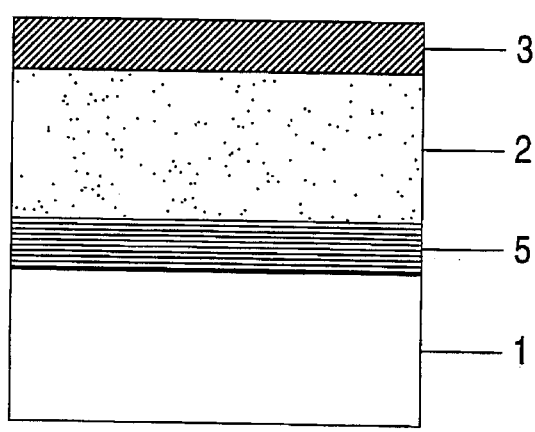
FIG. 3 shows still another layer structure of the reversible display medium according to the present invention.

The display medium of the present invention achieves a display by the action of heat only, heat combined with an electrical field, or heat combined with a magnetic field. It is basically composed of substrate 1 having formed thereon recording layer 2. If desired, protective layer 3 may be provided on recording layer 2 for the purpose of improving surface strength and heat resistance as shown in FIG. 1. Colored layer 4 or light-reflecting layer 5 may also be provided in preferred embodiments as shown in FIGS. 2 or 3. While not shown, a layer structure comprising a pair of electrode-backed substrates with a recording layer therebetween is preferably used for a display medium of electrically controlled display system.

The substrate which can be used in the present invention includes films made of synthetic resins, such as polyethylene terephthalate (PET), polyethylene naphthalate, polyethylene, polypropylene, butadiene, polyimide, and nylon; paper, ceramic materials, glass, and metals. The electrode-backed substrate preferably includes a transparent conducting glass plate or resin film, e.g., a glass plate or resin film having thereon an indium-tin oxide (ITO) deposit film. It is preferable to use a transparent substrate for transmission type display media.

The side chain type high polymeric liquid crystal which can be used in the present invention (hereinafter simply referred to as a high polymeric liquid crystal) is a copolymer essentially comprising a repeating unit derived from a liquid crystal monomer and a repeating unit derived from a non-liquid crystal monomer having a hydrogen bond-forming substituent. The hydrogen bond in the copolymer makes it possible to obtain excellent heat resistance and mechanical strength without reducing the characteristics of the high polymeric liquid crystal thereby preventing surface deterioration which would have occurred on recording with a thermal head, etc. The terminology "liquid crystal monomer" as used herein means a polymerizable compound having a mesogen substituent (a rigid molecule exhibiting liquid crystal properties) which may not always exhibit liquid crystal properties but, upon being polymerized, manifests liquid crystal properties. The non-liquid crystal monomer is a polymerizable compound having no mesogen substituent.

The high polymeric liquid crystal copolymer can be prepared by general radical polymerization or ionic polymerization of a monomer mixture comprising at least one of the above-mentioned liquid crystal monomers and at least one of the above-mentioned non-liquid crystal monomers at a prescribed mixing ratio. The copolymer can also be prepared by co-addition of the monomers to a reactive polymer, such as polyhydrogenated polysilicone. If desired, the resulting polymer is purified.

Liquid crystal monomers which can be used in the present invention are described in *Makromol. Chem.*, Vol. 179, p. 273 (1978), *Eur. Polym.J.*, Vol. 18, p. 651 (1982), and *Mol. Cryst. Liq. Cryst.*, Vol. 169, p. 167 (1989). Among them, for example, are various compounds composed of a rigid functional group having liquid crystal properties, such as a biphenyl skeleton, a phenyl benzoate skeleton, a cyclohexylbenzene skeleton, an azoxybenzene skeleton, an azobenzene skeleton, an azomethine skeleton, a phenylpyrimidine skeleton, a diphenylacetylene skeleton, a biphenyl benzoate skeleton, a cyclohexylbiphenyl skeleton, or a terphenyl skeleton, to which an acrylic or methacrylic ester group or a vinyl group is bonded via an alkyl spacer having a prescribed length.

Typical liquid crystal monomers include those represented by formulae:

$$CH_2=C(R)-COO-(CH_2)_m-O-A$$

$$CH_2=CH(CH_2)_m-O-A$$

wherein R represents a hydrogen atom or a methyl group; A represents a residue of a liquid crystal molecule (mesogen) having the following structural formula; and m represents an integer of from 1 to 30, preferably an integer of 2 to 12.

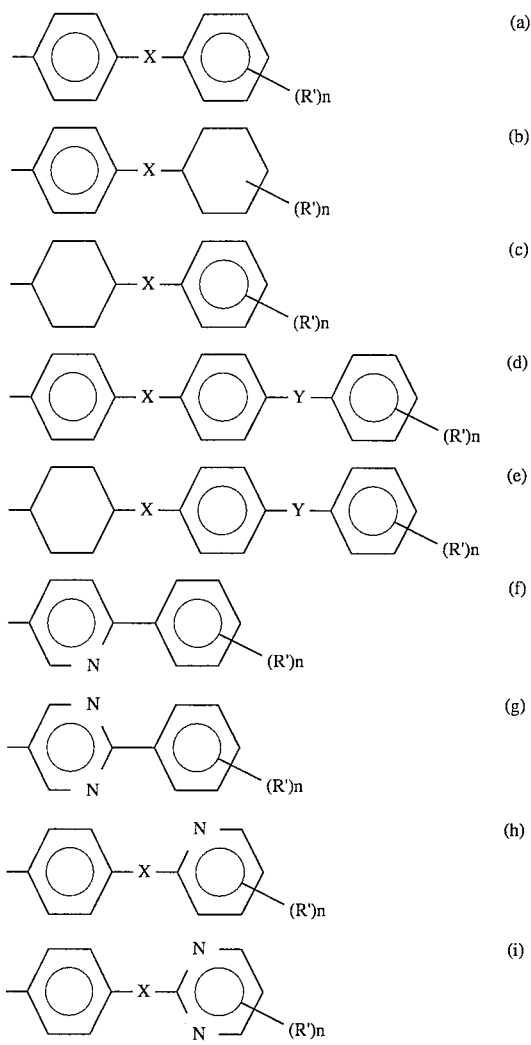

wherein X and Y, which may be the same or different, each represent a single bond, —N=N—, —N(→O)=N—, —CH=N—, —N=CH—, —COO—, —O(C=O)—, or —CH=CH—; $R^1$ represents an a halogen atom, an alkyl group preferably having 1 to 12 carbon atoms, more preferably 1 to 10 carbon atoms, an alkoxy group preferably having 1 to 12 carbon atoms, more preferably 1 to 10 carbon atoms, a carboxyl group or a cyano group; and n represents an integer of from 1 to 5; when n is 2 or greater, the plural $R^1$ groups may be the same or different.

The non-liquid crystal monomers having a hydrogen bond-forming substituent include various polymerizable compounds having a hydroxy group, a carboxyl group, a sulfonic group, a phosphoric group, a primary or secondary amino group, an acid amido group, a thiol group, etc. Typical examples are (meth)acrylic acid, 2-hydroxyethyl (meth)acrylate, 2-hydroxypropyl (meth)acrylate, 2-hydroxy-3-phenoxypropyl (meth)acrylate, glyceryl (meth)acrylate, (meth)acrylamide, 2-(meth)acryloyloxyethyl succinate, 2-(meth)acryloyloxyethyl phthalate, 2-(meth)acryloyloxyethyl-2-hydroxyethyl phthalate, 2-(meth)acryloyloxyethyl hexahydrophthalate, 4-[(meth)acryloxyalkyloxy)benzoic acid, mono- or di-2-(meth)acryloyloxyethyl phosphate, hydroxy-substituted styrene, vinylsulfonic acid, 2-propen-1-ol, and 5-hexen-1-ol. Inter alia, those having an acidic group, such as a carboxyl group, a sulfonic group or a phosphoric group and those having an alcoholic or phenolic hydroxy group are preferred because they form a hydrogen bond with high bonding strength.

These liquid crystal monomers and non-liquid crystal monomers may be used either individually or in combination of two or more thereof, respectively. If desired, commonly employed non-liquid crystal monomers having no hydrogen bond-forming substituent in their molecule may be added as a third component. Use of such a third component is preferred for improvements in heat sensitivity and display characteristics. Examples of suitable monomers having no hydrogen bond-forming substituent are alkyl (meth)acrylates and derivatives thereof, styrene and derivatives thereof, vinyl acetate, vinyl chloride, vinylidene chloride, vinyl pyrrolidone, isoprene, 1-hexene, and 1-octene.

While the copolymerization ratio of the two kinds of monomers in the high polymeric liquid crystal copolymer is subject to variation depending on the desired characteristics, the non-liquid crystal monomer content preferably ranges from 0.1 to 50% by weight, more preferably from 1 to 40% by weight, and most preferably from 1 to 20% by weight based on the total amount of the high polymeric liquid crystal copolymer. If the non-liquid crystal monomer content is less than 0.1% by weight, the recording layer tends to have insufficient strength. If it exceeds 50% by weight, the liquid crystal characteristics would be reduced.

The non-liquid crystal monomer having a hydrogen bond-forming substituent is preferably used in an amount of 1 to 20% by weight, more preferably 1 to 15% by weight based on the total amount of the high polymeric liquid crystal copolymer. The non-liquid crystal monomer having no hydrogen bond-forming substituent may be used in an amount of 1 to 50% by weight, preferably 20 to 50% by weight based on the total amount of the high polymeric liquid crystal copolymer.

The copolymer is not particularly limited in copolymerization form and may have various forms, such as a random copolymer, a grafted copolymer, an alternating copolymer, etc.

The copolymer preferably has a weight average molecular weight of from 1000 to 1,000,000. From the standpoint of film-forming properties, film strength, and switching time, a range of from 10,000 to 500,000 is preferred. If the weight average molecular weight is less than 1000, the film-forming properties or shape retention would be reduced. If it exceeds 1,000,000, the switching properties in an electrical field or orientation properties would be reduced.

If desired, the recording layer essentially comprising the high polymeric liquid crystal copolymer may further contain other components. For example, it may contain various antioxidants, such as hindered amine or hindered phenol, for the purpose of improving weather resistance. Various dichroic dyes, such as anthraquinone dyes, styryl dyes, azomethine dyes, and azo dyes, may be added for the purpose of improving display contrast. Various fluorescent dyes or pigments may be added for improvement in light-scattering properties. Further, in order to efficiently conduct thermal recording with a laser beam, it is recommended to add various laser light absorbing dyes or pigments. For example, in using a common semiconductor laser having a wavelength of 780 to 830 nm, near infrared absorbing dyes or pigments, such as phthalocyanine pigments, squarylium pigments, and azulenium pigments, may be added.

These additive components are added preferably in a total amount of from 0.01 to 5% by weight based on the total liquid crystal composition. Apart from these additives, low-molecular liquid crystals may be added in an amount of from 1 to 20% by weight based on the total liquid crystal composition for the purpose of improving display characteristics.

The recording layer can be formed by a conventional method, such as application of a solution of the liquid crystal composition in a solvent or application of a hot melt of the liquid crystal composition. The thickness of the recording layer is not particularly limited and subject to wide variation depending on the desired contrast. It is preferably selected from the range of from 1 to 100 μm, and particularly of from 3 to 20 μm.

The protective layer which may be provided on the recording layer preferably has high heat resistance. Usable materials for the protective layer include fluoroplastics, silicone resins, thermosetting resins, ultraviolet-curing resins, and electron radiation-curing resins. A plurality of protective layers may be provided. The protective layer can be formed by the similar coating method as for the recording layer. The protective layer preferably has a thickness of from 0.1 to 20 μm.

A colored layer, a light reflecting layer, or a light absorbing layer may be provided independently for improving contrast. Usable colored layers include polymer films containing a colorant. Usable light reflecting layers include films of a metal, such as aluminum or silver. Each of these layers preferably has a thickness of from 1 nm to 100 μm.

In a preferred embodiment of the present invention, the protective layer comprises a high polymeric compound having dispersed therein inorganic fine particles of, for example, silica, titanium oxide, zirconium oxide, or alumina, preferably having a primary particle size of not less than 10 nm. The inorganic fine particles may form agglomerated particles in the protective layer.

The high polymeric compound used in the protective layer includes various thermoplastic resins, such as fluoroplastics, ultraviolet-curing resins, such as acrylic resins and vinyl resins; electron radiation-curing resins, such as acrylic resins and vinyl resins; and thermosetting resins, such as epoxy resins. Those having high heat resistance and transparency are preferred. In particular, ultraviolet-curing resins, electron radiation-curing resins, and thermosetting resins are preferred for their high heat resistance.

The inorganic fine particles are preferably added in an amount of from 1 to 50% by weight, and particularly from 1 to 20% by weight, based on the protective layer.

The above-described inorganic particles-containing protective layer may have a single layer structure or a multilayer structure. Further, the inorganic particles-containing layer may be combined with a layer comprising other high polymers which serves, for example, for improvement in adhesion between the inorganic particles-containing protective layer and the recording layer or for prevention of mutual dissolution on the interface between these two layers.

The inorganic particles-containing protective layer preferably has a thickness of from 0.1 to 20 μm, and particularly from 1 to 5 μm.

While the above-mentioned inorganic particles-containing protective layer exerts excellent performance as a protective layer, it is preferable to make it serve as a reflection preventive layer by optimizing the particle size of the inorganic particles. In this case, the primary or secondary particle size of the inorganic particles is preferably adjusted to 0.1 μm or greater, preferably to a range of from 0.3 to 0.8 μm. Additionally, such a protective layer is writable with a pencil on account of its high frictional resistance.

A layer writable with a pencil preferably has fine surface unevenness to show high frictional resistance. Such a pencil-writable layer includes a coating layer prepared by a sol-gel method using a coupling agent, such as a silane coupling agent; a coating layer prepared by a sol-gel method using a coupling agent containing inorganic fine particles; and a deposit layer of an inorganic oxide.

Preferred is a layer prepared by a sol-gel method using a coupling agent containing inorganic fine particles. The inorganic fine particles to be used include silica, titanium oxide, zirconium oxide, indium oxide, tin oxide, zinc oxide, and alumina. The primary particle size of these inorganic fine particles is preferably 10 nm or greater. Suitable coupling agents include various silane alkoxide derivatives and various chlorosilane derivatives. The inorganic fine particles is preferably added in an amount of from 1 to 30% by weight based on the layer.

The pencil-writable layer preferably has a thickness of from 0.1 to 20 μm, and particularly from 1 to 5 μm.

Other layers may be provided between the pencil-writable layer and the recording layer for various purposes. For example, a protective layer may be provided for reducing physical damage to the recording layer, or an adhesive layer may be provided for improving durability.

The aforesaid inorganic particles-containing protective layer exhibits high heat resistance and high strength. In addition, it has a large specific surface area owing to the numerous fine unevenness on its both sides and therefore exhibits excellent adhesion to other layers, such as the recording layer, hardly causing layer separation on its interface. Where this layer contains a thermosetting resin as a high polymeric compound, the stress occurring in the protective layer due to shrinkage on curing or thermal expansion on thermal recording can be alleviated, thus minimizing adverse influences upon the recording layer and reducing cracks in the protective layer.

Thus, where an inorganic particles-containing protective layer is provided on the recording layer, the reversible display medium exhibits excellent durability on repeated use; surface deterioration of the recording layer can be prevented, and separation or cracking of the protective layer can be prevented.

Further, the aforesaid inorganic particles-containing protective layer, with the particle size of the inorganic particles being controlled so as to be longer than the wavelength of light, which also serves as a reflection preventive layer greatly improves display characteristics when directly seen, preventing reflection of light in the vicinities.

Where the reversible display medium according to this embodiment has the above-mentioned pencil-writable layer on the recording layer, the medium can be repeatedly used for recording not only on a thermal printer or a laser printer but by handwriting with a pencil. The writing with a pencil can be erased with a rubber eraser.

The high polymeric liquid crystal in the recording layer preferably has a multi-domain structure comprising a plurality of liquid crystal domains for obtaining excellent display characteristics (light-scattering properties). Such a multi-domain structure may be optimized by altering the copolymerization ratio of the liquid crystal monomer and the non-liquid crystal monomer. In particular, high light-scattering properties are ensured to provide an excellent display contrast where the high polymeric liquid crystal has such a multi-domain structure that the domain at the maximum of the domain number distribution has a diameter of not greater than 3 μm, especially not greater than 1.5 μm (within the wavelength range of visible light).

The reversible display medium of the present invention is applicable to various display systems. For example, an electrical field or a magnetic field is applied to the recording layer to unidirectionally orientate the liquid crystal molecules to once make the layer transparent (initialization). Then, heat of laser light or a thermal head is imagewise applied thereto to disturb the orientation of the part of the liquid crystal molecules to cause light scattering.

In another display system, switching between a liquid crystal state (light-scattered state) and a non-liquid crystal state (transparent state) can be repeated through control of heat only. More specifically, the recording layer as prepared by coating assumes a light-scattered state (white turbidity) due to many fine liquid crystal domains (i.e., a multi-domain structure). The white turbid recording layer is imagewise heated by means of a thermal head or a laser to make the heated part isotropic, followed by quenching to a temperature below the glass transition point of the recording layer to fix the heated part in the isotropic state, whereby the thus recorded area becomes transparent. Erasure of the thus recorded image can be carried out by cooling the recording layer more slowly than for recording to restore the transparent area to the initial light-scattered state. The heat for recording and erasion can be controlled by, for example, adjustment of pulse width or amount of energy applied to a thermal head.

In the above-mentioned display system utilizing an electrical field or a magnetic field, an electrical field or a magnetic field is applied to the display medium while keeping the medium at a given temperature under heating to cause the liquid crystal molecules to unidirectionally orientate, followed by cooling, to thereby change the recording layer into an optically transparent state (initialization). Then, the recording layer is imagewise heated and then cooled with no electrical field or magnetic field applied to form a multi-domain structure, whereby an image comprising white turbidity can be obtained on a transparent background.

The present invention will now be illustrated in greater detail with reference to Examples, but it should be understood that the present invention is not construed as being limited thereto. All the percents and parts are by weight unless otherwise indicated.

EXAMPLE 1

4-Acryloyloxyhexyloxy-4'-cyanobiphenyl (1.9 g) as a liquid crystal monomer and 0.1 g of acrylic acid as a non-liquid crystal monomer having a hydrogen bond-forming substituent were copolymerized in tetrahydrofuran in the presence of azobisisobutyronitrile as an initiator. The crude copolymer was purified by repeating fractional precipitation using ethyl alcohol three times to obtain 1.9 g of a high polymeric liquid crystal represented by formula (I) shown below. The resulting high polymeric liquid crystal had a weight average molecular weight (hereinafter abbreviated as Mw) of 30000 (measured by GPC on polystyrene conversion; hereinafter the same), a glass transition temperature (hereinafter abbreviated as Tg) of 45° C. and a phase transition point of 125° C.

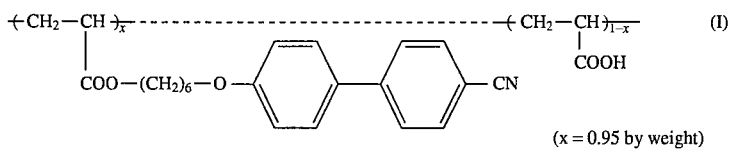

(x = 0.95 by weight)

A 100 μm thick PET film having an aluminum deposit layer was coated with a 30% methyl ethyl ketone solution of the thus prepared high polymeric liquid crystal by means of a blade coater and dried to form a high polymeric liquid crystal recording layer having a thickness of about 6 μm. An ultraviolet-curing resin ("Aronix UV", produced by Toagosei Chemical Industry Co., Ltd.) was further applied thereon and cured by means of a high-pressure mercury lamp to form a protective layer having a thickness of about 3 μm.

The resulting display medium was heated in an oven at 120° C., taken out, and cooled to make the entire area of the recording layer white turbid. On recording on the medium with a thermal head, the recorded area of the recording layer turned transparent to give clear letters on the white background.

EXAMPLE 2

A high polymeric liquid crystal represented by formula (II) shown below was synthesized in the same manner as in Example 1, except for using 2-hydroxyethyl acrylate as a non-liquid crystal monomer. The resulting high polymeric liquid crystal has an Mw of 42000, a Tg of 40° C., and a phase transition point of 110° C. A display medium was prepared using the high polymeric liquid crystal in the same manner as in Example 1.

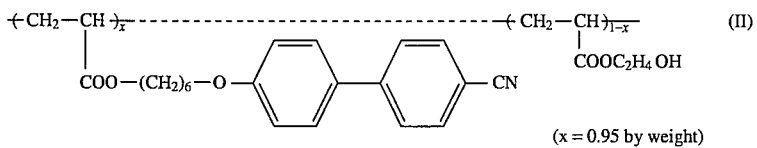

(x = 0.95 by weight)

EXAMPLE 3

A high polymeric liquid crystal represented by formula (III) shown below was synthesized in the same manner as in Example 1, except for using methacrylic acid as a non-liquid crystal monomer. The resulting high polymeric liquid crystal had an Mw of 33000, a Tg of 45° C., and a phase transition point of 126° C. A display medium was prepared using the high polymeric liquid crystal in the same manner as in Example 1.

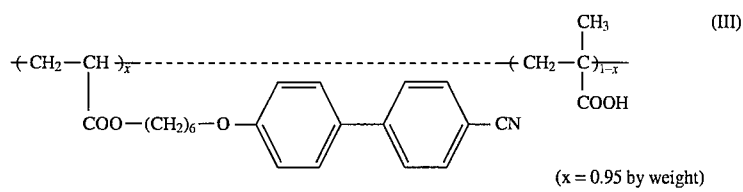

(x = 0.95 by weight)

EXAMPLE 4

A high polymeric liquid crystal represented by formula (IV) shown below was synthesized in the same manner as in Example 1, except for using butyl acrylate and acrylic acid as non-liquid crystal monomers. The resulting high polymeric liquid crystal had an Mw of 50000, a Tg of 40° C., and a phase transition point of 105° C. A display medium was prepared using the high polymeric liquid crystal in the same manner as in Example 1.

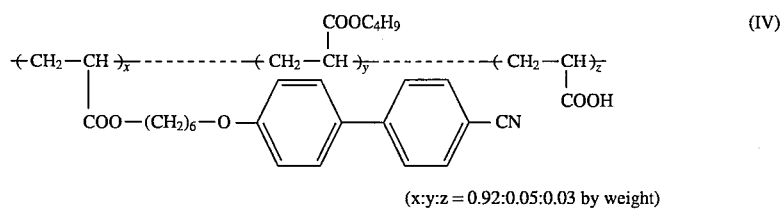

(x:y:z = 0.92:0.05:0.03 by weight)

EXAMPLE 5

A high polymeric liquid crystal (1.8 g) comprising repeating units (A), (B), and (C) represented by formula (V) shown below was synthesized in the same manner as in Example 1, except for using 1.2 g of 4-acryloyloxyhexyloxy-4'-cyanobiphenyl and 0.7 g of 4-methacryloyloxyhexyloxy-4'-cyanobiphenyl as liquid crystal monomers and 0.1 g of acrylic acid as a non-liquid crystal monomer. The resulting high polymeric liquid crystal had an Mw of 55000, a Tg of 45° C., and a phase transition point of 110° C. A display medium was prepared using the high polymeric liquid crystal in the same manner as in Example 1.

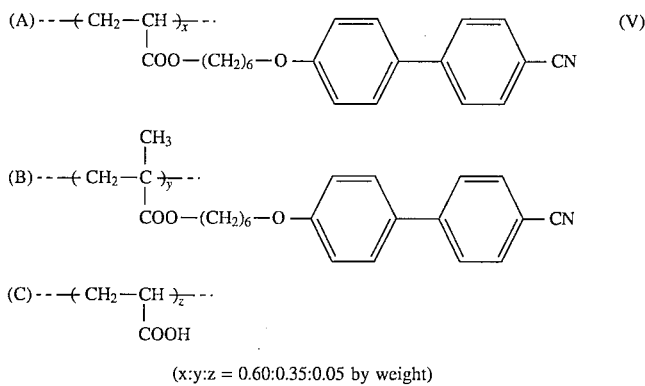

(x:y:z = 0.60:0.35:0.05 by weight)

EXAMPLE 6

A high polymeric liquid crystal represented by formula (VI) shown below was synthesized in the same manner as in Example 1, except for using hydroxyethyl acrylate and acrylic acid as non-liquid crystal monomers. The resulting high polymeric liquid crystal had an Mw of 45000, a Tg of 40° C., and a phase transition point of 106° C. A display medium was prepared using the high polymeric liquid crystal in the same manner as in Example 1.

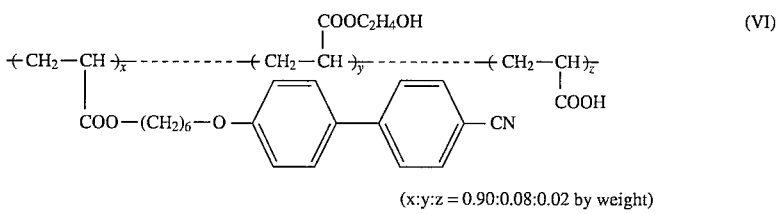

(x:y:z = 0.90:0.08:0.02 by weight)

EXAMPLE 7

A high polymeric liquid crystal (1.8 g) comprising repeating units (A), (B), (C), and (D) represented by formula (VII) shown below was synthesized in the same manner as in Example 1, except for using 1.26 g of 4-acryloyloxyhexyloxy-4'-cyanobiphenyl and 0.68 g of 4-acryloyloxypropyloxy-4'-cyanobiphenyl as liquid crystal monomers and 0.04 g of acrylic acid and 0.02 g of butyl acrylate as non-liquid crystal monomers. The resulting high polymeric liquid crystal had an Mw of 40000, a Tg of 45° C., and a phase transition point of 103° C. A display medium was prepared using the high polymeric liquid crystal in the same manner as in Example 1.

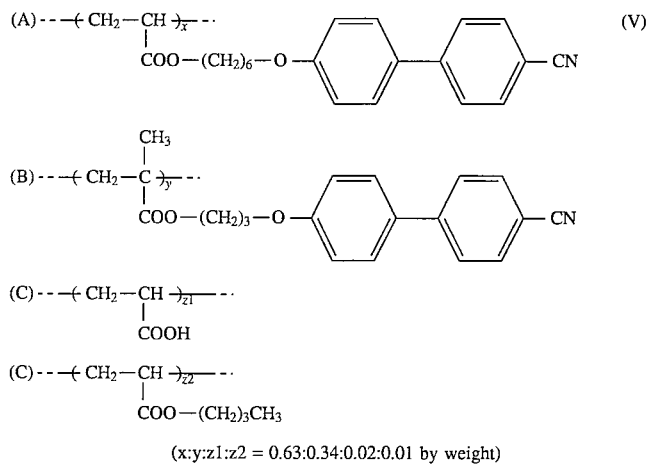

(x:y:z1:z2 = 0.63:0.34:0.02:0.01 by weight)

COMPARATIVE EXAMPLE 1

A high polymeric liquid crystal homopolymer represented by formula (VIII) shown below was synthesized in the same manner as in Example 1, except for using only 4-acryloyoxyhexyloxy-4'-cyanobiphenyl as a liquid crystal monomer. The resulting polymer had an Mw of 35000, a Tg of 35° C., and a phase transition point of 122° C. A display medium was prepared using the high polymeric liquid crystal in the same manner as in Example 1.

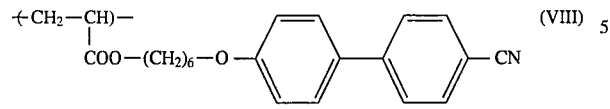

(VIII)

Each of the display media prepared in Examples 1 to 7 and Comparative Example 1 was evaluated as follows.
1) Durability on Repetition of Recording and Erasion:

Recording was conducted by application of energy of about 0.2 to 0.5 mJ/dot by means of a thermal printer (200 dpi). Erasion was conducted by heating to about 100° to 130° C. with a hot stamper. The recording and erasion were repeated 100 times to evaluate durability.

2) Display Characteristics:

The reflective optical density of the recorded area and non-recorded area (white turbid area) was measured with "X-rite 404A", manufactured by X-rite Co., and a contrast ratio was obtained from the ratio of the measured reflectances.

3) Domain Diameter Distribution:

After repeating recording/erasion 100 times, the domain diameter of the multi-domain structure was measured with a laser diffraction particle size distribution meter ("LA:700", manufactured by HORIBA Co., Ltd.) to obtain the domain diameter distribution and the domain diameter at the maximum of the domain number distribution.

The results of the measurements are shown in Table 1 below.

TABLE 1

| Example No. | Optical Density | | Contrast Ratio | |
|---|---|---|---|---|
| | Non-recorded Area | Recorded Area | Initial | The 100th Cycle |
| Example 1 | 0.25 | 1.8 | 35 | 35 |
| Example 2 | 0.25 | 1.8 | 35 | 35 |
| Example 3 | 0.25 | 1.8 | 35 | 35 |
| Example 4 | 0.22 | 1.8 | 38 | 37 |
| Example 5 | 0.23 | 1.8 | 37 | 37 |
| Example 6 | 0.24 | 1.8 | 36 | 36 |
| Example 7 | 0.24 | 1.8 | 35 | 35 |
| Compara. Example 1 | 0.28 | 0.8 | 3.3 | 2.0 |

All the samples of Examples 1 to 7 exhibited excellent whiteness (degree of white turbidity) before recording, giving a reflective optical density of not more than 0.25, which corresponds to a reflectance of 55% or more. To the contrary, the sample of Comparative Example had a low degree of whiteness.

On recording, the recorded area of the samples of Examples 1 to 7 turned transparent uniformly to give clear silver letters on a white background. The contrast ratio of the recorded area calculated from the optical density was 20 or more in every sample, showing very excellent display characteristics, whereas the comparative sample was not made completely transparent on recording, failing to display letters distinctly. The reflective contrast ratio was as low as about 3.

In all the samples, the recorded area could be restored to its initial white turbid state by hot stamping. When recording/erasion was repeated 100 times, the samples of Examples 1 to 7 underwent no substantial change in contrast ratio, proving highly durable. To the contrary, the comparative sample underwent a great change in contrast ratio from the initial one, which is attributed to formation of unevenness on the recording layer and the protective layer.

After repeating recording/erasion 100 times, in Examples 1 to 7, the diameter of domains was distributed over a range of from 50 nm to 1400 nm, with the domain diameter at the maximum of the domain number distribution being from 290 to 880 nm, while, in Comparative Example 1, the diameter of domains was distributed over a range of from 0.4 to 9.5 μm, with the domain diameter at the maximum of the domain number distribution being 1.8 μm. These results lend confirmation to the fact that the white turbidity (display characteristics) largely depends on the domain diameter and its distribution.

It was thus proved that the reversible display medium according to the present invention is excellent in durability as well as display characteristics.

The reversible display medium of the present invention comprises a recording layer of a high polymeric liquid crystal copolymer comprising at least a liquid crystal monomer and a non-liquid crystal monomer having a hydrogen bond-forming substituent. The display medium having such a device structure is excellent in durability on repeated use, heat resistance, display contrast, record preservability, and processability.

The reversible display medium of the present invention is capable of repeatedly switching between a light-transmitted state and a light-scattered state through the action of heat, an electrical field and/or a magnetic field, is thin like paper, makes a reflective display soft to the eye, and favors resources saving. Further, having no limitation in display area, it is applicable as a display medium for such a wide display device as a white board. Having a high contrast for light transmission, it is also applicable as a projector display medium, such as an OHP sheet.

EXAMPLE 8

About 100 μm thick polyethylene terephthalate (PET) film having an aluminum deposit layer as a light reflecting layer was coated with a 30% methyl ethyl ketone solution of the high polymeric liquid crystal obtained in EXAMPLE 1 by means of a blade coater to form a high polymeric liquid crystal recording layer having a thickness of about 10 μm.

A hexane solution of a dispersion of 1 part of silica fine particles ("Aerosil TT600", produced by Nippon Aerosil Co., Ltd.; primary particle size: about 40 nm) in 12 parts of an ultraviolet-curing resin composition ("Aronix UV", produced by Toagosei Chemical Industry Co., Ltd.) was applied to the recording layer, dried, and cured by using a high-pressure mercury lamp to form a protective layer having a thickness of about 3 μm.

The resulting reversible display medium entirely had opaque whiteness in its initialized state and, on recording on a thermal printer, gave silver letters on the white background. The display could be erased by heating all over. The display after repeating recording/erasion 100 times showed no change from the initial one. The display was easy to see owing to the reflection preventive effect of the protective layer.

EXAMPLE 9

In the same manner as in Example 8, a high polymeric liquid crystal recording layer having a thickness of about 10 μm was formed on an PET film (thickness: about 100 μm) having an aluminum deposit layer as a light reflecting layer.

A 5% ethyl alcohol solution of an alcohol-soluble nylon resin ("CM8000", produced by Toray Industries, Inc.) was applied to the recording layer and dried to form a layer having a thickness of about 0.5 μm. A tetrahydrofuran solution of a dispersion comprising 1 part of titanium oxide fine particles ("P25", produced by Nippon Aerosil Co., Ltd.; primary particle size: about 21 nm) in 10 parts of an ultraviolet-curing resin composition ("Aronix UV") was further applied thereto, dried, and cured by using a high-pressure mercury lamp to form a layer having a thickness of about 3 μm.

The resulting reversible display medium entirely had opaque whiteness in its initialized state and, on recording on a thermal printer, gave silver letters on the white background. The display could be erased by heating all over. The display after repeating recording/erasion 100 times showed no change from the initial one. The display was easy to see owing to the reflection preventive effect of the protective layer.

The reversible display medium having a protective layer comprising a high polymeric compound and inorganic fine particles is prevented from suffering from surface deterioration, separation of the protective layer, or development of cracks in the protective layer through repetition of recording/erasion. Therefore, the medium has excellent durability on repeated use. Further, the protective layer with its inorganic fine particles having a controlled particle diameter also manifests an excellent reflection preventive effect to greatly improve the display characteristics when directly seen.

EXAMPLE 10

About 100 μm thick polyethylene terephthalate (PET) film having an aluminum deposit layer as a light reflecting layer was coated with a 30% methyl ethyl ketone solution of the high polymeric liquid crystal obtained in EXAMPLE 1 by means of a blade coater to form a high polymeric liquid crystal recording layer having a thickness of about 10 μm. Further, a dispersion of 1 part of titanium oxide "P25" in 10 parts of triethoxypropylsilane was applied thereon and heated at 100° C. for 1 hour to form a pencil-writable layer having a thickness of about 1 μm.

The resulting reversible display medium entirely had opaque whiteness in its initialized state and, on recording on a thermal printer, gave silver letters on the white background. The display could be erased by heating all over. The medium was writable with a pencil ("MITSU-BISHI" 9800 produced by MITSUBISHI PENCIL CO., LTD.; hardness: HB) to give letters that were reversible with a rubber eraser.

While the invention has been described in detail and with reference to specific examples thereof, it will be apparent to one skilled in the art that various changes and modifications can be made therein without departing from the spirit and scope thereof.

What is claimed is:

1. A reversible display medium comprising a substrate having a recording layer containing a side chain polymeric liquid crystal repeatedly switchable between a transparent state and a light-scattered state by the action of at least one of heat, an electrical field, and a magnetic field, wherein said side chain polymeric liquid crystal is a copolymer comprising at least a repeating unit derived from a liquid crystal monomer and a repeating unit derived from a non-liquid crystal monomer having a hydrogen bond-forming substituent, said side chain polymeric liquid crystal has a multi-domain structure in which the domain diameter at the maximum of the domain number distribution is not greater than 3 μm.

2. The reversible display medium as claimed in claim 1, wherein said copolymer further comprises a repeating unit derived from a non-liquid crystal monomer having no hydrogen bond-forming substituent.

3. The reversible display medium as claimed in claim 1, wherein said hydrogen bond-forming substituent is a carboxyl group, a sulfonic group, a phosphoric group or a hydroxy group.

4. The reversible display medium as claimed in claim 1, further including a protective layer provided on said recording layer.

5. The reversible display medium as claimed in claim 4, wherein said protective layer includes a polymeric compound and inorganic particles.

6. The reversible display medium as claimed in claim 5, wherein said polymeric compound includes a thermosetting resin.

7. The reversible display medium as claimed in claim 4, wherein said protective layer also serves as a reflection preventive layer.

8. The reversible display medium as claimed in claim 1, further including a layer, which is writable on with a pencil, provided on said recording layer.

9. The reversible display medium as claimed in claim 8, wherein said layer which is writable on with a pencil includes inorganic particles.

* * * * *